United States Patent
Kim et al.

(10) Patent No.: US 8,903,139 B2
(45) Date of Patent: Dec. 2, 2014

(54) METHOD OF RECONSTRUCTING THREE-DIMENSIONAL FACIAL SHAPE

(71) Applicant: Korea Institute of Science and Technology, Seoul (KR)

(72) Inventors: Ig Jae Kim, Seoul (KR); Jaewon Kim, Seoul (KR); Sang Chul Ahn, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 89 days.

(21) Appl. No.: 13/757,057

(22) Filed: Feb. 1, 2013

(65) Prior Publication Data

US 2013/0202162 A1 Aug. 8, 2013

(30) Foreign Application Priority Data

Feb. 2, 2012 (KR) .................. 10-2012-0010847

(51) Int. Cl.
 *G06K 9/00* (2006.01)
 *G06T 3/40* (2006.01)

(52) U.S. Cl.
 CPC .......... *G06K 9/00281* (2013.01); *G06T 3/4053* (2013.01); *G06K 9/00201* (2013.01)
 USPC ........... 382/118; 382/115; 382/154; 382/278; 340/5.52; 340/5.81

(58) Field of Classification Search
 USPC ........ 382/115, 118, 154, 278; 340/5.52, 5.81, 340/5.82
 See application file for complete search history.

(56) References Cited

U.S. PATENT DOCUMENTS

| | | | | |
|---|---|---|---|---|
| 5,995,110 A | * | 11/1999 | Litwinowicz | 715/848 |
| 6,919,892 B1 | * | 7/2005 | Cheiky et al. | 345/473 |
| 7,653,204 B2 | * | 1/2010 | Chen et al. | 381/119 |
| 8,553,037 B2 | * | 10/2013 | Smith et al. | 345/473 |
| 8,570,404 B2 | * | 10/2013 | Ando et al. | 348/240.99 |

FOREIGN PATENT DOCUMENTS

| | | |
|---|---|---|
| JP | 2002-032741 A | 1/2002 |
| JP | 2011-022805 A | 2/2011 |

OTHER PUBLICATIONS

Korean Office Action issued Aug. 30, 2013 in counterpart Korean Patent Application No. 10-2012-0010847. (8 pages including English translation).

* cited by examiner

*Primary Examiner* — Yosef Kassa
(74) *Attorney, Agent, or Firm* — NSIP Law

(57) ABSTRACT

A method of reconstructing a three-dimensional (3D) facial shape with super resolution even from a short moving picture having a front facial image by acquiring a super-resolution facial image by applying, as a weighting factor, a per-unit-patch similarity between a target frame and frames remaining after excluding the target frame from among a plurality of continuous frames including the front facial image, and reconstructing the 3D facial shape based on the acquired super-resolution facial image.

8 Claims, 7 Drawing Sheets

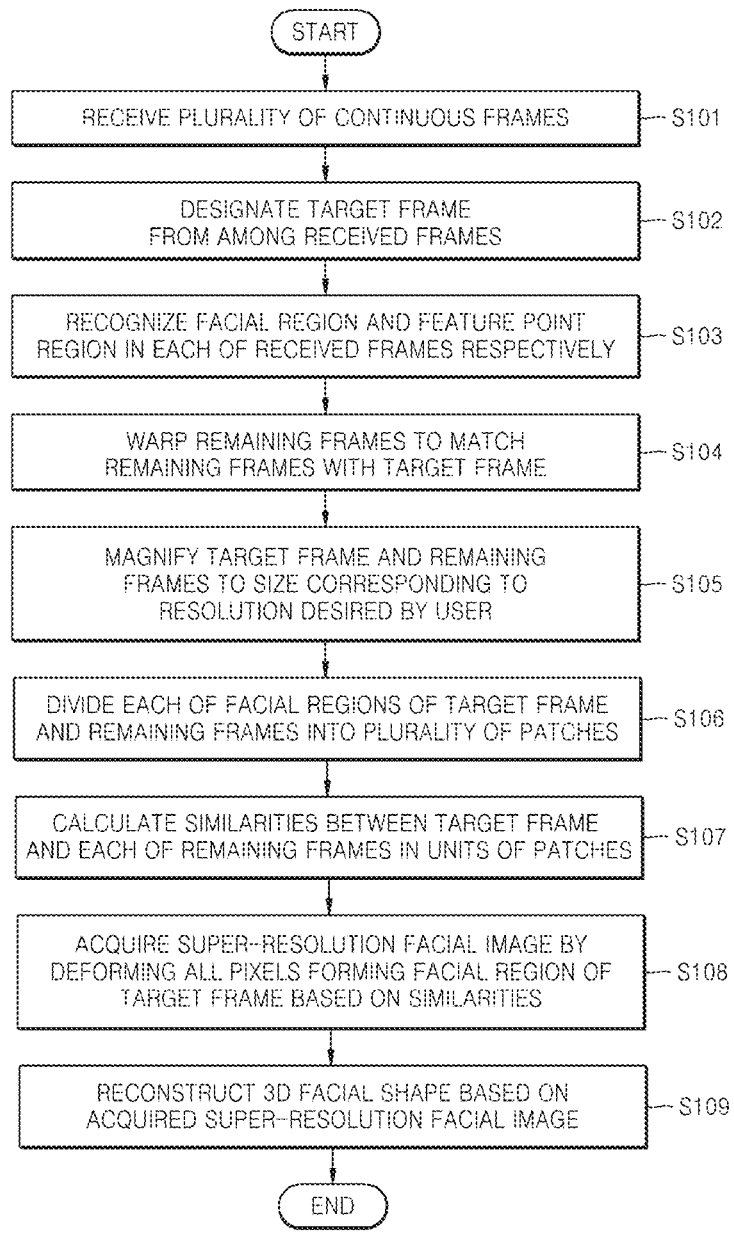

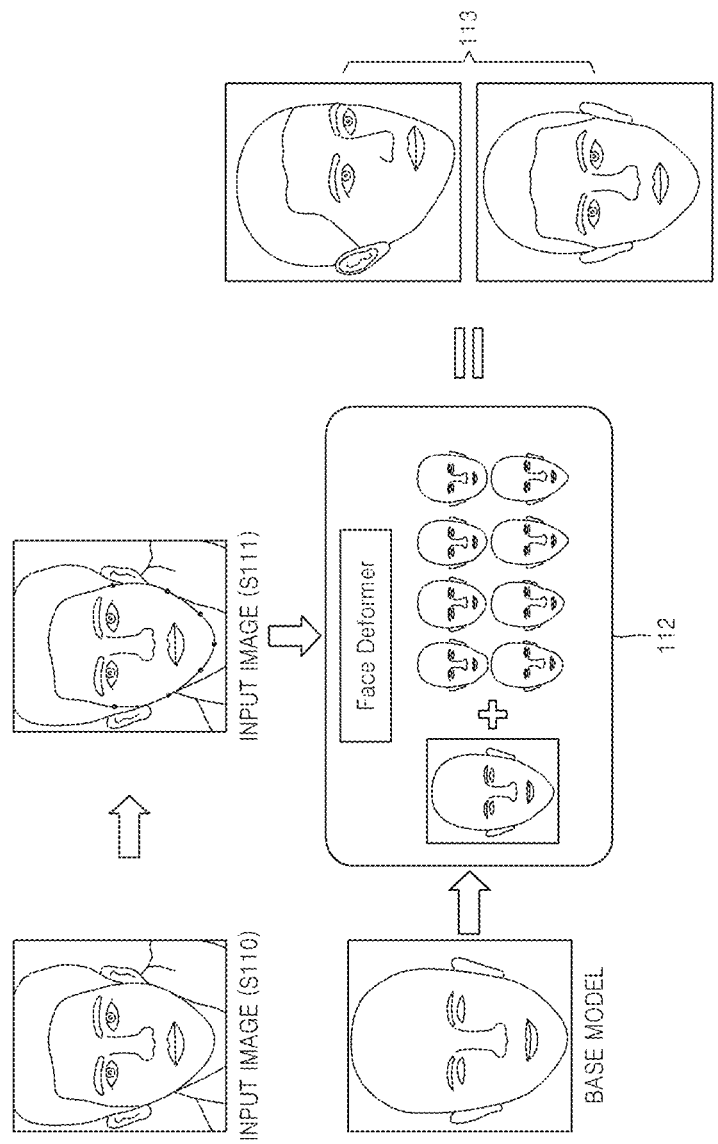

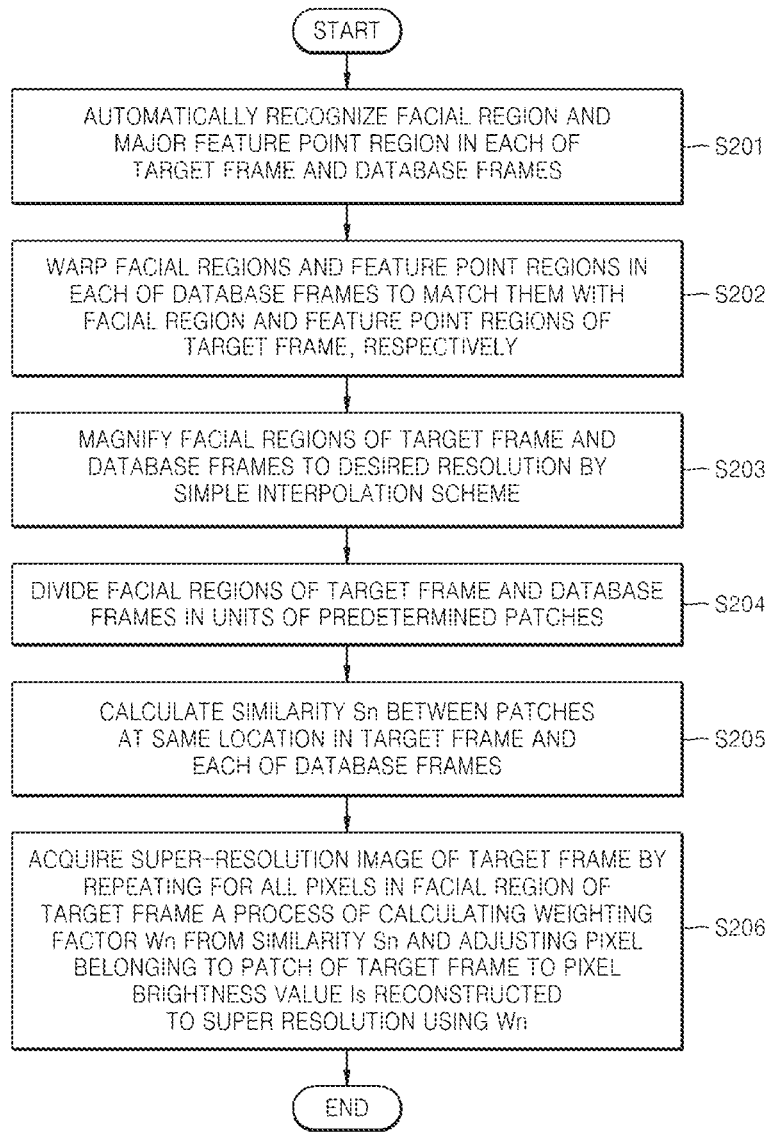

METHOD OF RECONSTRUCTING THREE-DIMENSIONAL FACIAL SHAPE

CROSS-REFERENCE TO RELATED PATENT APPLICATION

This application claims the benefit of Korean Patent Application No. 10-2012-0010847, filed on Feb. 2, 2012, in the Korean Intellectual Property Office, the disclosure of which is incorporated herein in its entirety by reference.

BACKGROUND OF THE INVENTION

1. Field of the Invention

The present invention relates to a method of reconstructing a three-dimensional (3D) facial shape, and more particularly, to a method of reconstructing a 3D facial shape, whereby a captured 3D facial shape of a human being is reconstructed from a facial image in several frames of a captured moving picture.

2. Description of the Related Art

Images captured using outdoor cameras have been recently used to investigate suspects in various cases detected by using access control devices, Automated Teller Machines (ATMs), and Closed Circuit TV (CCTV) monitoring devices.

Although techniques for automatically generating a 3D facial shape from several frames of a captured image or moving picture have been developed in this regard, a reconstruction result of a 3D facial shape in most of these techniques significantly depends on a frame resolution of a corresponding image or moving picture. Thus, when a frame resolution of an image or moving picture is low, a reconstruction result of a 3D facial shape has a very low resolution, resulting in difficulties of using the 3D facial shape for face recognition or an investigation of a suspect. A 3D facial shape accurate enough to be used for face recognition or an investigation of a suspect may be obtained only if a human face in a close-up position is generated with high resolution from a frame of a captured image or moving picture. Thus, the scope of using these techniques is very limited.

In general, since it is difficult to acquire images of high quality by using cameras in access control devices, ATMs, CCTV monitoring devices, and so forth, and a ratio of a human face in a frame of an image or moving picture captured in a general state to the entire frame is not large, a facial region usually has a low resolution, and thus, it is difficult to use captured images for an investigation of a suspect.

As described above, the conventional 3D facial shape reconstructing techniques can be effectively used to investigate a suspect only if a specific capturing condition is satisfied, i.e., a human face is photographed in a close-up position.

SUMMARY OF THE INVENTION

The present invention provides a method of reconstructing a three-dimensional (3D) facial shape by acquiring a facial image with super resolution higher than that of a front facial image from a moving picture and reconstructing the 3D facial shape based on the acquired facial image.

Technical aspects of the present invention are not limited to the above, and other technical aspects not described herein will be clearly understood by one of ordinary skill in the art from the disclosure below. According to an aspect of the present invention, there is provided a method of reconstructing a three-dimensional (3D) facial shape, the method including: designating a target frame to be used for 3D reconstruction from among a plurality of frames including a front facial image; recognizing a facial region in each of the plurality of frames and at least one feature point region in the facial region; warping frames remaining after excluding the target frame from among the plurality of frames to match a facial region and at least one feature point region in each of the remaining frames with a facial region and at least one feature point region of the target frame, respectively; magnifying the facial regions of the target frame and the warped remaining frames to a size corresponding to a super resolution higher than that of the front facial image; dividing each of the magnified facial regions of the target frame and the warped remaining frames into a plurality of unit patches; and acquiring a super-resolution facial image for 3D facial shape reconstruction by deforming all pixels forming the facial region of the target frame based on similarities between unit patches of the target frame and unit patches of each of the remaining frames.

According to another aspect of the present invention, there is provided a non-transitory computer-readable storage medium having stored thereon a computer-readable program for three-dimensional (3D) facial shape reconstruction, the computer-readable program including: a function of designating a target frame to be used for 3D reconstruction from among a plurality of frames including a front facial image; a function of recognizing a facial region in each of the plurality of frames and at least one feature point region in the facial region; a function of warping frames remaining after excluding the target frame from among the plurality of frames to match a facial region and at least one feature point region in each of the remaining frames with a facial region and at least one feature point region of the target frame, respectively; a function of magnifying the facial regions of the target frame and the warped remaining frames to a size corresponding to a super resolution higher than that of the front facial image; a function of dividing each of the magnified facial regions of the target frame and the warped remaining frames into a plurality of unit patches; and a function of acquiring a super-resolution facial image for 3D facial shape reconstruction by deforming all pixels forming the facial region of the target frame based on similarities between unit patches of the target frame and unit patches of each of the remaining frames.

BRIEF DESCRIPTION OF THE DRAWINGS

The above and other features and advantages of the present invention will become more apparent by describing in detail exemplary embodiments thereof with reference to the attached drawings in which:

FIG. 1A is a flowchart illustrating a method of reconstructing a three-dimensional (3D) facial shape, according to an embodiment of the present invention;

FIGS. 1B and 1C are diagrams illustrating a conventional algorithm used in the method of FIG. 1;

FIGS. 2A to 2C are diagrams illustrating a method for reconstructing a three-dimensional (3D) facial shape, according to an embodiment of the present invention;

DETAILED DESCRIPTION OF THE INVENTION

Figure 1B:
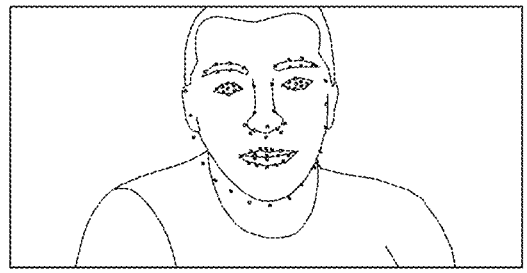
Figure 1B:
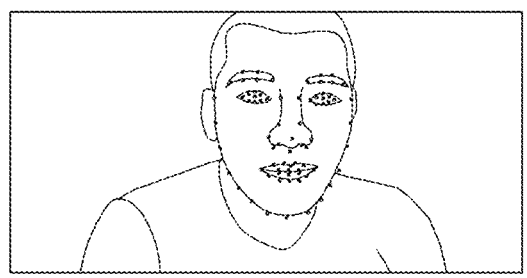
Figure 1B:
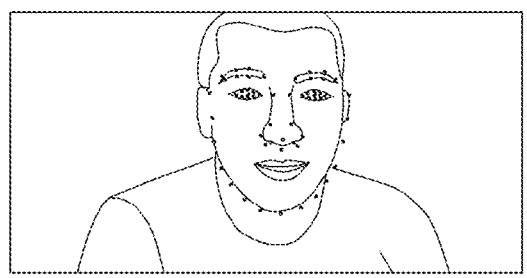
Figure 1B:
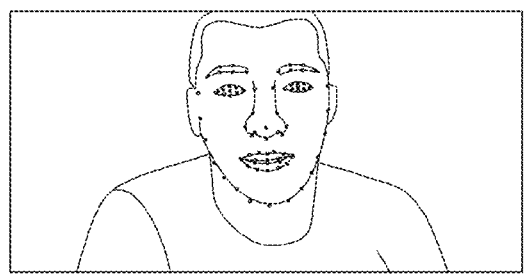

The contents below illustrate only the principle of the present invention. Therefore, although not clearly described or shown in the specification, one of ordinary skill in the art may implement the principle of the present invention and make various apparatuses covered by the spirit and scope of the present invention. In addition, it should be understood in principle that all conditional terms and embodiments listed in the specification are obviously intended only for the purpose to understand the spirit of the present invention and are not limited to the specifically listed embodiments and states. It should also be understood that all detailed descriptions listing not only the principle, considerations, and embodiments of the present invention but also other specific embodiments are intended to include these structural and functional equivalents. Furthermore, it should be understood that these equivalents include not only currently known equivalents but also equivalents to be developed in the future, i.e., all elements invented to perform the same function regardless of their structures.

Therefore, the functions of various elements shown in the drawings, which include a processor or a function block shown as a similar concept, may be provided by using not only exclusive hardware but also software-executable hardware in association with proper software. When the functions are provided by a processor, they may be provided by a single exclusive processor, a single shared processor, or a plurality of individual processors, some of which can be shared. Moreover, the explicit use of the term "processor", "controller", or other similar device should not be considered as exclusively indicating software-executable hardware and may implicitly include Digital Signal Processor (DSP) hardware, a Read Only Memory (ROM) for storing software, a Random Access Memory (RAM), and a non-volatile storage device without any limitation. Other well-known public use hardware may be included.

The objectives, characteristics, and merits of the present invention will be described in detail by explaining embodiments of the invention with reference to the attached drawings. In the following description, well-known functions or constructions are not described in detail since they would obscure the invention.

In the specification, when a certain part includes a certain component, this indicates that the part may further include another component.

Hereinafter, the present invention will be described more fully with reference to the accompanying drawings, in which exemplary embodiments of the invention are shown.

FIG. 1A is a flowchart illustrating a method of reconstructing a three-dimensional (3D) facial shape, according to an embodiment of the present invention, and FIGS. 1B and 1C are diagrams for describing a conventional algorithm used in the method of FIG. 1.

Referring to FIG. 1A, in operation S101, a plurality of frames including a front facial image are received. In operation S102, a target frame to be used for 3D reconstruction from among the plurality of frames is designated by a user or may be automatically extracted by a conventional face recognition algorithm. The plurality of frames may correspond to continuous frames which include a front facial image and are a portion of a moving picture.

In operation S103, a facial region in each of the plurality of frames and at least one feature point region in the facial region are recognized. A feature point region in the facial region indicates a major geometric feature point, such as an eye, a nose, a mouth, an ear, an eyebrow, or a beard, which may determine a facial shape, and recognition of such facial region and feature point region may be implemented by using a conventional feature point extraction computation, such as the Stasm method or other face recognition algorithms.

FIG. 1B illustrates results of extracting a facial region and feature point regions from several continuous frames including a front facial image in a moving picture by using the Stasm method, in order to show an example of recognizing a facial region and feature point regions in operation S103.

Although the Stasm method and FIG. 1B are illustrated in the current embodiment as an example of recognizing a facial region in each of the plurality of frames and at least one feature point region in the facial region, the present invention is not limited thereto.

In operation S104, frames remaining after excluding the target frame from among the plurality of frames are warped based on the per-frame facial images and the at least one feature point region, which are extracted in operation S103, to match the remaining frames with the target frame. The warping indicates geometric image processing for twisting a specific partial region to change its relative location or adjusting a size of the specific partial region so that the whole image is not uniform, and in the current embodiment, the warping indicates that each of the remaining frames is deformed to match relative locations of the facial region and the at least one feature point region in each of the remaining frames with relative locations of a facial region and at least one feature point region of the target frame, respectively.

In operation S105, the facial regions of the target frame designated in operation S102 and the remaining frames warped in operation S104 are magnified to a size corresponding to a resolution desired by the user, i.e., a super resolution higher than that of the front facial image received in operation S101. Although a simple interpolation scheme is generally used as a method of magnifying a facial region, the present invention is not limited thereto.

In operation S106, each of the magnified facial regions of the target frame and the warped remaining frames is divided into a plurality of unit patches.

In operation S107, similarities between the target frame and each of the remaining frames are calculated in units of the unit patches divided in operation S106. That is, similarities between each unit patch of the target frame and unit patches of the remaining frames corresponding to the unit patch of the target frame are calculated.

In operation S108, a super-resolution facial image is acquired by deforming all pixels forming the facial region of the target frame based on the similarities calculated in operation S107. Accordingly, the facial region of the target frame, which is vaguely magnified using the simple interpolation scheme in operation S105, may be clearly changed to obtain the resolution desired by the user.

In a method of deforming the pixels in the facial region of the target frame using similarity, the pixels in the facial region of the target frame may be adjusted by applying the similarity as a weighting factor. As a concrete adjustment method, computations for deriving a relatively correctly adjusted pixel value when similarity is applied as a weighting factor may be used. However, the present invention is not limited thereto, and various image processing computations may be used in the adjustment method.

Since similarities are calculated in units of the unit patches in operation S107, when pixel values in the facial region of the target frame are adjusted in operation S108, the same weighting factor may be applied in units of the unit patches, and a super-resolution facial image may be acquired by repeating this per-pixel pixel value adjustment process for all the pixels forming the facial region of the target frame.

Finally, in operation S109, a 3D facial shape is reconstructed based on the super-resolution facial image acquired in operation S108.

FIG. 1C illustrates the 3D facial shape reconstruction in operation S109 of FIG. 1.

Referring to FIG. 1C, a 3D facial shape 113 may be generated by a face deformer 112 storing 3D facial shape base models by receiving the super-resolution facial image acquired in operation S108 as a 2D input image in operation S110, designating feature points in the 2D input image in operation S111, and performing feature point matching between and linearly combining the 2D input image and a 3D facial shape base model.

Although the algorithm shown in FIG. 1C is illustrated as an example of reconstructing a 3D facial shape based on a super-resolution facial image in the current embodiment, this is merely one embodiment for convenience of description, and the present invention is not limited thereto.

Figure 2A:
Figure 2C:
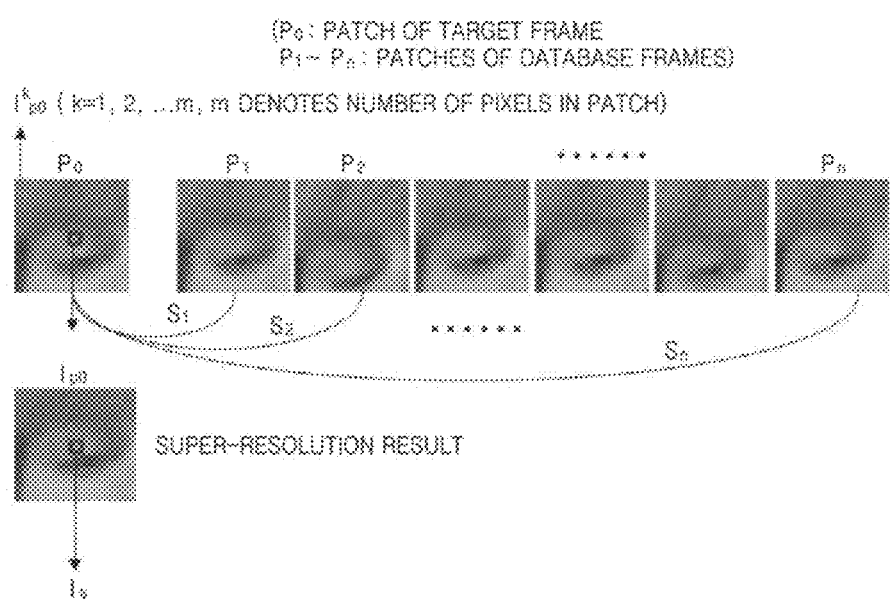

FIGS. 2A to 2C are diagrams for describing a method for reconstructing a 3D facial shape, according to an embodiment of the present invention. FIG. 2A shows some (12 frames) of about 30 continuous frames of a portion (about 5 seconds) of a moving picture including a front facial image, all of which have a low resolution (e.g., 117*80) not suitable for 3D reconstruction, and a user may select one of the frames and designate the selected frame as a target frame to be used for 3D reconstruction arbitrarily or according to a predetermined algorithm. However, the present invention is not limited thereto.

FIG. 2B is a flowchart illustrating a method of acquiring a super-resolution facial image based on a plurality of frames (e.g., 12 frames) shown in FIG. 2A. Hereinafter, for convenience of description, frames remaining after excluding the target frame from among the plurality of frames are referred to as "database frames."

In operation S201, a facial region and feature point regions in each of the target frame and the database frames are recognized by using a predetermined algorithm. In operation S202, the facial region and the feature point regions in each of the database frames are warped to match them with the facial region and the feature point regions of the target frame, respectively.

In operation S203, the facial regions of the target frame and the database frames are magnified to a size corresponding to a resolution desired by a user by using a simple interpolation scheme.

In operation S204, the facial regions of the target frame and the database frames, which are magnified in operation S203, are divided in units of predetermined patches.

In operation S205, a similarity Sn between patches at the same location in the target frame and each of the database frames is calculated.

The basic assumption in the 3D facial shape reconstructing method according to the current embodiment is that the super-resolution pixel information of the target frame is inherent in the database frames. In this case, it is difficult to evaluate how much a database frame or a pixel in a database frame contributes when reconstructing a pixel in the target frame with super resolution. In the current embodiment, as described below, patch similarities between the target frame and each of the database frames are obtained, it is considered that a database frame having a higher similarity has more super-resolution pixel information required for the target frame, and such similarity is used as a weighting factor for computation processing for super-resolution reconstruction.

Here, $S_n$ indicates a similarity between a patch P1 of the target frame and a corresponding patch $P_n$ of an nth database frame and may be calculated using Equation 1.

$$S_n = \sum_{k=1}^{m} (I_{p0}^k - I_{pn}^k)^2 \quad (1)$$

In operation S206, a 2D super-resolution image of the target frame is acquired by calculating a weighting factor $W_n$ by Equation 2 from the similarity Sn calculated in operation S205, adjusting a pixel belonging to a patch of the target frame to a pixel brightness value $I_s$ reconstructed to a super resolution by Equation 3 using the calculated weighting factor $W_n$, and repeating the pixel brightness value adjusting process for all pixels included in the facial region of the target frame.

$$W_n = e^{-\frac{S_n}{2\sigma^2}} \quad (2)$$

$$I_s = \frac{\sum_{j=1}^{n} I_{p0} + I_{pj} w_j}{\sum_{j=1}^{n} 1^2 + w_j} \quad (3)$$

As described above, when a weighting factor is determined according to a similarity, as a result, pixels in a patch of a database frame having a high similarity have high contribution in relation to a super-resolution pixel value (pixel brightness value $I_s$) of a corresponding patch of the target frame. Thus, when this patch computation is performed for all pixels forming a facial image of the target frame, a super-resolution facial image may be reconstructed.

FIG. 2C illustrates a process of calculating similarities between the target frame and each of the database frames based on the plurality of frames shown in FIG. 2A and acquiring a super-resolution facial image based on the calculated similarities. In the current embodiment, $P_o$ denotes a patch of the target frame, and $P_1$ to $P_n$ denote corresponding patches of first to nth database frames among the remaining frames except for the target frame.

Figure 2D:
FIG. 2D illustrates a 2D facial image with super resolution (e.g., 329*218), which is acquired in the computation process shown in FIGS. 2B and 2C.
Figure 2E:
FIG. 2E illustrates results obtained by lighting a 3D facial shape, which is reconstructed based on the 2D facial image with super resolution, at a plurality of angles.

FIG. 2D illustrates a 2D super resolution facial image (e.g., 329*218), which is acquired in the computation process shown in FIGS. 2B and 2C, and FIG. 2E illustrates results obtained by lighting a 3D facial shape, which is reconstructed based on the 2D super resolution facial image, at a plurality of angles.

As described above, according to the 3D facial shape reconstructing method according to an embodiment of the present invention, a 3D facial shape may be reconstructed with super resolution even from a short moving picture including a front facial image by acquiring a super-resolution facial image by applying, as a weighting factor, a per-unit-patch similarity between a target frame and frames remaining by excluding the target frame from among a plurality of continuous frames including the front facial image, and reconstructing the 3D facial shape based on the acquired super-resolution facial image. In particular, when the 3D facial shape reconstructing method is applied to a monitoring CCTV moving picture, a 3D face of a crime suspect may be clearly reconstructed, thereby allowing efficient handling of a criminal case.

According to the present invention, a 3D facial shape of a person may be reconstructed with super resolution from a short moving picture including front facial images of the person.

In addition, a service for automatically generating a 3D facial shape of a suspect captured by a CCTV camera may be provided for an anti-crime CCTV monitoring service.

Further, a digital avatar of high image quality based on a 3D face of a specific person may be automatically generated from a moving picture of ordinary users in order to use the digital avatar for various Information Technology (IT)/smart phone related applications (virtual reality, augmented reality, game, and animation production).

The method of reconstructing a 3D facial shape according to the present invention can also be embodied as computer-readable codes stored on a non-transitory computer-readable storage medium. The non-transitory computer-readable storage medium is any data storage device that can store data which can be thereafter read by a computer system. Examples of the non-transitory computer-readable storage medium include read-only memory (ROM), random-access memory (RAM), CD-ROMs, magnetic tapes, floppy disks, optical data storage devices, and the like. The non-transitory computer-readable storage medium can also be distributed over network coupled computer systems so that the computer-readable codes are stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of reconstructing a three-dimensional (3D) facial shape, the method comprising:
    designating a target frame to be used for 3D reconstruction from among a plurality of frames including a front facial image;
    recognizing a facial region in each of the plurality of frames and at least one feature point region in the facial region;
    warping frames remaining after excluding the target frame from among the plurality of frames, to match a facial region and at least one feature point region in each of the remaining frames with a facial region and at least one feature point region of the target frame, respectively;
    magnifying the facial regions of the target frame and the warped remaining frames to a size corresponding to a super resolution higher than that of the front facial image;
    dividing each of the magnified facial regions of the target frame and the warped remaining frames into a plurality of unit patches; and
    acquiring a super-resolution facial image for 3D facial shape reconstruction by deforming all pixels forming the facial region of the target frame based on similarities between unit patches of the target frame and unit patches of each of the remaining frames.

2. The method of claim 1, wherein the magnifying comprises magnifying the facial regions by using a simple interpolation scheme.

3. The method of claim 1, wherein the warping comprises deforming each of the remaining frames to respectively match relative locations of a facial region and at least one feature point region in each of the remaining frames with relative locations of the facial region and the at least one feature point region of the target frame.

4. The method of claim 1, wherein the acquiring comprises repeating, for all pixels forming the facial region of the target frame, a process of adjusting pixel values belonging to a unit patch of the target frame by applying the similarities as weighting factors of the pixel values belonging to the unit patch of the target frame.

5. The method of claim 1, wherein the acquiring comprises replacing a pixel value of each of all pixels forming the facial region of the target frame by a weighted mean value of a corresponding pixel in the target frame and corresponding pixels in the remaining frames.

6. The method of claim 1, wherein the acquiring comprises replacing a pixel value of each of all pixels forming the facial region of the target frame by a pixel value $I_s$ calculated by using the equation below $$I_s = \frac{\sum_{j=1}^{n} I_{p0} + I_{pj} w_j}{\sum_{j=1}^{n} 1^2 + w_j},$$

wherein $I_{p0}$ denotes a pixel value of the target frame, $I_{pj}$ denotes a pixel value of a jth frame of the remaining frames, $W_j$ denotes a similarity between a unit patch of the target frame and a unit patch of the jth frame, and n denotes the number of remaining frames.

7. The method of claim 1, further comprising reconstructing a 3D facial shape based on the super-resolution facial image.

8. A non-transitory computer-readable storage medium storing a computer-readable program for executing a method of reconstructing a three-dimensional (3D) facial shape, the method comprising:
    a function of designating a target frame to be used for 3D reconstruction from among a plurality of frames including a front facial image;
    a function of recognizing a facial region in each of the plurality of frames and at least one feature point region in the facial region;
    a function of warping frames remaining after excluding the target frame from among the plurality of frames to match a facial region and at least one feature point region in each of the remaining frames with a facial region and at least one feature point region of the target frame, respectively;
    a function of magnifying the facial regions of the target frame and the warped remaining frames to a size corresponding to a super resolution higher than that of the front facial image;
    a function of dividing each of the magnified facial regions of the target frame and the warped remaining frames into a plurality of unit patches; and
    a function of acquiring a super-resolution facial image for 3D facial shape reconstruction by deforming all pixels forming the facial region of the target frame based on similarities between unit patches of the target frame and unit patches of each of the remaining frames.

* * * * *